United States Patent [19]

El-Hag et al.

[11] Patent Number: 4,603,052

[45] Date of Patent: Jul. 29, 1986

[54] METHOD FOR OVEN-HEATING FROZEN FRIED FOODS

[75] Inventors: Nabil A. El-Hag, Peekskill; Kenneth R. Schwabe, Tuckahoe; Gary T. Dulin, Tarrytown, all of N.Y.

[73] Assignee: General Foods Corporation, White Plains, N.Y.

[21] Appl. No.: 214,896

[22] Filed: Dec. 9, 1980

Related U.S. Application Data

[62] Division of Ser. No. 55,876, Jun. 27, 1979, abandoned.

[51] Int. Cl.⁴ .......................... A23L 1/01; A23L 1/216
[52] U.S. Cl. ....................................... 426/523; 99/445; 99/450; 426/113; 426/124; 426/393; 426/438
[58] Field of Search ................. 126/390; 99/444, 445, 99/447, 448, 450, 438; 220/408; 426/113, 114, 119, 523, 106, 124, 393

[56] References Cited

U.S. PATENT DOCUMENTS

| 74,282 | 2/1868 | Beeman, II | 99/450 |
|---|---|---|---|
| 114,444 | 5/1871 | Jones | 99/450 |
| 200,622 | 2/1878 | McConnell | 99/444 |
| 254,770 | 3/1882 | Hurd | 99/450 |
| 255,380 | 3/1882 | Dodson | 99/444 |
| 284,295 | 9/1883 | Hailes | 99/444 |
| 1,021,640 | 3/1912 | Steitler | 220/23.8 |
| 1,066,552 | 7/1913 | Taylor et al. | 99/450 |
| 1,263,103 | 4/1918 | Pfeil | 220/23.8 |
| 1,591,291 | 7/1926 | Detwiler | 99/450 |
| 2,850,392 | 9/1958 | Gunsberg | 99/192 |
| 2,969,292 | 1/1961 | Heller | 99/171 |
| 3,199,438 | 8/1965 | Myler et al. | 99/450 |
| 3,211,082 | 10/1965 | Sachnoff et al. | 99/444 |
| 3,219,460 | 11/1965 | Brown | 99/192 |
| 3,221,729 | 12/1965 | Beasley et al. | 126/21 |
| 3,347,181 | 10/1967 | Pizzo | 107/54 |
| 3,357,342 | 12/1967 | Dreyfus | 99/418 |
| 3,369,481 | 2/1968 | Pappas | 99/450 |
| 3,389,651 | 6/1968 | Schultz | 99/393 |
| 3,391,005 | 7/1968 | Babigan | 99/100 |
| 3,415,662 | 12/1968 | Koger et al. | 99/171 |
| 3,493,726 | 2/1970 | Bardeau | 99/450 |
| 3,517,606 | 6/1970 | Myles et al. | 99/450 |
| 3,534,667 | 10/1970 | Keathley | 99/448 |
| 3,548,736 | 12/1970 | Wahl, Jr. | 99/234 |
| 3,549,381 | 12/1970 | Kinsinger | 99/77.1 |
| 3,643,812 | 2/1972 | Mander et al. | 211/74 |
| 3,718,274 | 2/1973 | Reifers et al. | 229/2.5 |
| 3,751,629 | 8/1973 | Eisler | 219/201 |
| 3,764,057 | 10/1973 | Reifers et al. | 229/2.5 |
| 3,765,592 | 10/1973 | Chadbourne | 229/2.5 |
| 3,793,936 | 2/1974 | Wills | 99/334 |
| 3,899,962 | 8/1975 | Federico | 99/447 |
| 3,982,655 | 9/1976 | Kaupert | 220/23.6 |
| 4,068,572 | 1/1978 | Vogt | 99/447 |

FOREIGN PATENT DOCUMENTS

543735 3/1942 United Kingdom .

OTHER PUBLICATIONS

Modern Packaging, Mar. 1956, pp. 190-191.
McCain Foods Limited, package label from McCain's Straight Cut French Fried Potatoes.

Primary Examiner—Steve Alvo
Attorney, Agent, or Firm—Thomas R. Savoie; Thomas A. Marcoux; Daniel J. Donovan

[57] ABSTRACT

A disposable tray for heating comestibles to obtain a deep fried appearance and texture of the resultant products by maximizing convective heating of the comestibles and minimizing conductive heating thereof. The top surface of the tray has a waffle design with an array of raised ridges thereon for supporting the comestible products on the ridge crests while minimizing conductive heat transfer thereto. A plurality of round apertures are provided in the tray surface between the ridges to allow heated air to flow therethrough to convectively heat the products. Raised frustoconical shaped fins are provided around the apertures, with the fins rising to a portion of the height of the ridges. The fins function to increase the convective flow of hot air through the apertures while not providing substantial contact with the comestibles. The raised fins also form troughs around the apertures to collect oil released by the products during heating thereof.

6 Claims, 6 Drawing Figures

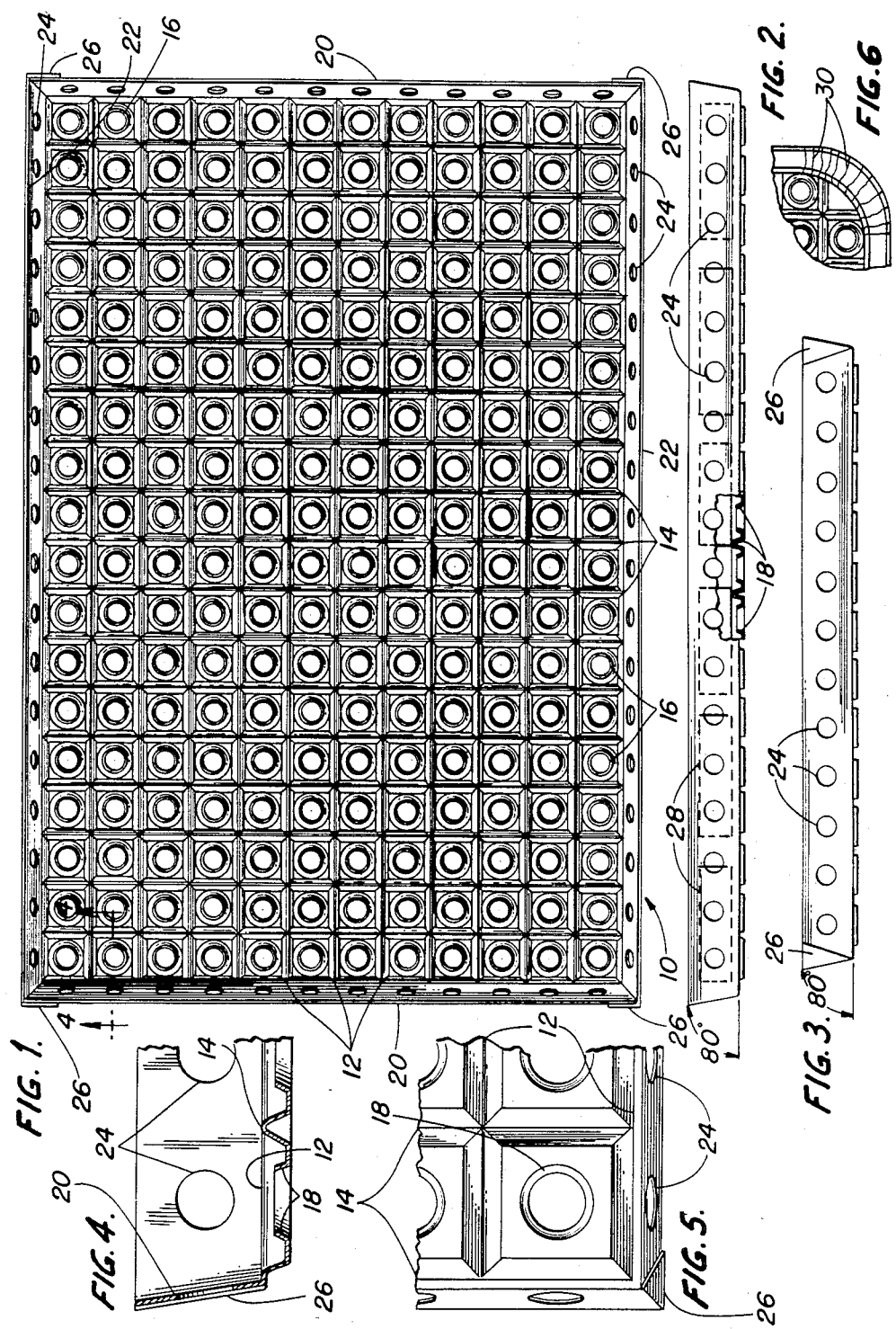

METHOD FOR OVEN-HEATING FROZEN FRIED FOODS

This is a division of application Ser. No. 055,876, filed June 27, 1979, now abandoned.

BACKGROUND OF THE INVENTION

Field of the Invention

The present invention relates generally to the field of preparation of comestible products, and more particularly pertains to a packaging arrangement for frozen comestibles which allows the products to be heated therein in such a manner that the resultant products have a deep fried appearance and texture.

Frozen comestible products, such as frozen fish, chicken, french fries etc., are often provided on disposable trays formed of sheet aluminum, plastic, or paper pulp materials. Unfortunately, many of these trays have little utility outside the scope of a shipping and/or marketing container, and necessitate the transfer of the products to other vessels for reheating and/or cooking.

It has long been an object in the processed food arts to develop a frozen comestible product which may be heated in an oven, and results in an appetizing product having a deep fried appearance and texture with proper moisture content. The prior art recognizes that a product of that nature cannot be obtained simply by reheating a frozen product at a given temperature for a sufficient period of time. The achievement of a uniformly deep fried quality and appearance for the crust and texture of the comestible has been one of the most difficult problems in this art. Reheating a frozen food or comestible in a typical baking pan operates to transfer heat to the product mainly by conduction from the pan which often results in localized burns in surface areas of the comestible. Further, products which are reheated or cooked from a frozen state often have overcooked surface areas and/or undercooked interior portions. Also many comestible products currently on the market result in a final product which is dry but not crispy, with those properties often being the result of nonuniform and inefficient heat transfer to the product during preparation in an oven. Another common problem in the technology of preparation of foods from frozen comestibles is the product ion of a soggy final product, or technically a food product having too high a moisture content.

It is well recognized in the art that the aesthetic appearance of a frozen comestible is extremely important in offering a product having significant consumer appeal. Customers are less likely to purchase a product having an initial shelf appearance which is aesthetically unpleasing, and also are less likely to repurchase a product which does not have a pleasing appearance after preparation in an oven.

Patent application Ser. No. 928,345, filed July 28, 1978, now abandoned for Simulation of Deep Fat Fried Foods discloses a process for simulating the taste and texture of freshly deep fat fried comestibles by heating frozen food products on a heat transferring utensil such as a screen or grid having a plurality of open spaces and a minimum amount of contact with the frozen food products. The heat transferring utensil supports the discrete comestible pieces in an oven, while minimizing the effect of conductive heating and maximizing the effect of convective heating thereon. A preferred embodiment disclosed therein is a single layer indented and perforated heat transferring tray having indentations therein creating a waffling effect in the form of troughs and crests. The perforation are of two types. A first kind of perforations provides a large amount of open area so as to optimize heat transference by convection and radiation, while simultaneously providing minimum contact between the food and the tray. The second type of perforations are pinlike in nature and create a surface tension on the heat transferring apparatus which collects and holds oils released by the comestibles during heating thereof. Another embodiment disclosed therein, relates to a cooking utensil for supporting and cooking foods within an oven. In this embodiment, rather than designing the heat transferring utensil with a narrow thickness, it has a broad thickness with long tapered holes. The tapered holes are stated to create a higher velocity of warm air than would ordinarily occur with holes in a thin body such as sheet metal tray. The beneficial effect of the higher velocity warm air jets lies in their increased ability to convectively heat the comestible products.

SUMMARY OF THE INVENTION

Accordingly, in order to overcome or ameliorate many problems of the prior art, the present invention proposes a tray arrangement which may or may not have side walls, for heating comestibles to obtain products having a deep fried appearance and texture by maximizing convective heating of the comestibles and minimizing conductive heating thereof. The tray arrangement should be suitable for oven preparation of a wide variety of comestible products, such as chicken, fish, shrimp, shrimp analog, french fries, mushrooms, eggplant, bananas, apples, etc. In accordance with this invention, a tray arrangement for heating comestible products to obtain a deep fried appearance and texture by maximizing convective heating of the comestible products and minimizing conductive heating thereof, comprises: (a) a tray having a means to support the comestibles while minimizing conductive heat transfer thereto, and (b) a means to allow heated air to convectively heat the food products, and (c) a means serving to collect oil released by the products during heating thereof. Preferably the tray arrangement should further comprise a means to increase the convective flow of hot air through the means of element (b), while not substantially contacting the comestibles.

In one embodiment, the tray has a plurality of raised ridges formed in its upper surface which function to support the comestibles on the ridge crests to minimize conductive heat transfer thereto. The raised ridges can extend in a single direction only or they can be a set of concentric circles. The space between successive ridges would be determined as a function of the size of the commestible. Large pieces of chicken or fish would not require as many ridges for support as ¼ inch shoe string potatoes. A plurality of apertures are formed in the tray between the ridges to allow heated air to flow therethrough to convectively heat the comestible products. In order to maximize the effect of convective heating and minimize the effect of conductive heating, the preferred embodiment incorporates apertures that have open spaces greater than 10% of the tray arrangement surface area. For the purposes of this disclosure, aperture open area is defined as that portion of the non contigious area of the tray arrangement. Further, inwardly-tapered, raised fins are provided around the apertures, rising to a portion of the height of the ridges, to increase the convective flow of hot air through the apertures while not providing any substantial contact with the products thus preventing conductive transfer of heat thereto. Also, the raised ridges in conjunction with the raised fins serve to form troughs around the apertures to collect oil released by the products during heating thereof. These troughs effectively prevent the oil from dipping into the oven. In one embodiment of the invention the tray is pressed or stamped out of low gauge aluminum foil, thereby resulting in a product which is conveniently disposable after usage thereof.

In accordance with one preferred packaging arrangement, the arrangement has a waffle design with a plurality of raised ridges. The comestible products are arranged on a single layer over the crests of the raised ridges. The plurality of raised ridges include a first plurality of regularly spaced ridges extending in a first direction and a second plurality of regularly spaced ridges extending in a second direction, substantially perpendicular to said first direction, with the spacing between said first plurality of regularly spaced ridges being substantially equal to the spacing between the second plurality of ridges. This type of arrangement permits support for smaller shaped commestibles. Further, each aperture has a substantially circular shape, and each raised fin around an aperture is substantially frustoconical in shape, with each fin having a height substantially 50 percent or greater than but less than the full height of a raised ridge. The tray has four side walls, and each side wall is provided with a plurality of regularly spaced apertures along its length to increase the convection flow of hot air around the comestibles. However, one skilled in the art will appreciate that side walls are not required in the tray arrangement. They may be incorporated into the tray arrangement for structure integrity and rigidity.

In one disclosed embodiment each adjacent pair of wall surfaces is joined together by a sharp triangularity-shaped crease of metal folded along one of the wall surfaces, and in a second embodiment each adjacent pair of wall surfaces is joined together by a pressed overlapping of the material at a corner to form a plurality of irregularly arranged creases thereat. In both embodiments, the tray may be formed by stamping a rectangularly shaped piece of low gauge aluminum foil, whereby the tray is easily manufacturable and further is conveniently disposable after usage thereof.

In accordance with the teachings of the present invention, the waffle design in the tray surface enhances the rigidity of the tray structure in addition to minimizing heat transfer to the comestibles by conduction. The waffle design also provides support for the comestible products on the ridges crests without regard to the orientation of a particular product piece, which may be a concern with a tray having ridges extending in a single direction. Moreover, it has been found that the convective heating tray may be manufactured from darkly coated materials which thereby increase the tray's radiant heat transferance. It is suspected that the increase in radiant heat would complimenting the convective heat transferance.

Accordingly a primary object of the present invention is the development of a packaging arrangement for frozen comestibles suitable for direct usage in an oven and which results in a product having a deep fried appearance and texture. Furthermore the resulting product should be a significant improvement over frozen counterparts presently on the market and at least on a parity with existing deep fat fried products and fast food counterparts, particularly in terms of consumer satisfaction regarding aesthetic appearance and taste. Furthermore, the present invention contemplates the provision of a final oven-prepared product which is at least as convenient as existing frozen comestible products in terms of preparation and cleanup etc., thereby providing a significant convenience advantage over preparation of a similar product from raw materials.

The present invention has as another object the achievement of a package for frozen comestibles having a storage life of at least six months under normal frozen distribution conditions while maintaining acceptable organoleptic quality. Furthermore the package should be capable of being taken from a freezer and placed directly in an oven for heating therein at normal oven temperatures and time ranges. Also the package should have a wide tolerance to variations in over related conditions, as typically occur from kitchen to kitchen, while still resulting in an acceptable organoleptic product. Accordingly a primary object of the present invention is the provision of a package for frozen comestible products in which a high and uniform rate of convective heat transfer in an oven results in a final product similar to one obtained with a deep fat frying process.

BRIEF DESCRIPTION OF THE DRAWINGS

The foregoing and other objects and advantages of an inventive and packaging arrangement for comestible products in accordance with the teachings of the present invention may be more readily understood by one skilled in the art, having reference to the following detailed description of several preferred embodiments thereof, taken in conjunction with the accompanying drawings in which like reference numerals are used to refer to identical elements throughout the several views, and in which:

FIG. 1 is a top planar view of a convective heating tray constructed pursuant to the teachings of the present invention;

FIG. 2 is a front elevational view of the convective heating tray of FIG. 1 with a layer of comestible products arranged thereon, and also shows a partial cutaway portion illustrating further details of construction of the tray;

FIG. 3 is a side elevational view of the tray of FIG. 1, illustrating further details of construction of the corners;

FIG. 4 is an enlarged sectional view taken along line 4—4 in FIG. 1, and illustrates further details of the waffle pattern in the tray surface and the convective apertures provided therein;

FIG. 5 is an enlarged fragmentary bottom illustration of one corner of the convective heating tray; and FIG. 6 is a fragmentary top planar view of one corner of a second embodiment of the present invention constructed pursuant to the teachings herein.

DETAILED DESCRIPTION OF THE DRAWINGS

Referring to the drawings in detail, FIG. 1 illustrates a top planar view of a conductive heating tray 10 constructed in accordance with the teachings herein and having a waffle design impressed upon its surface. The waffle design includes a first plurality of horizontally illustrated ridges 12 and a second plurality of vertically illustrated ridges 14, with the intersecting first and second pluralities of ridges 12 and 14 forming a matrix like waffle design in the surface of the tray 10. A plurality of apertures 16 are provided in the tray surface, with each aperture being surrounded by four encompassing ridges. A frustoconically shaped raised fin 18 is provided around each aperture 16, as illustrated in FIGS. 2 and 4, with each frustoconical fin rising to a fraction of the height of the ridge crests. When the tray is placed in a heated oven, the raised fins 18 function to increase the convective flow of hot air through the apertures by providing a chimney effect for each aperture. The structure of each fin rises to a fraction of the height of the encompassing ridge crests such that it does not provide substantial contact with comestible products placed on the tray to minimize the conductive transfer of heat to the products. The tray has side walls 20 provided along its widthwise dimension and side walls 22 provided along its lengthwise dimension, with each side wall being creased upwardly through a bend of approximately eighty degrees with respect to the tray surface. A plurality of apertures 20 are provided in each of the four side walls of the tray structure to further assist in the convective flow of hot air around comestible products placed on the tray. The tray is initially formed from a flat sheet of low gauge aluminum foil, from which it is pressed or stamped in a conventional manner. Thereafter, the four side walls of the tray are bent upwardly through a bend of approximately eighty degrees with respect to the tray surface. The formation of the tray in this manner produces an excess aluminum triangular tab 26 at each corner of the tray which is thereafter creased flat against one of the side walls. In this manner, the tray can be formed relatively inexpensively from a rectangularly shaped piece of low gauge aluminum foil thereby producing a packaging arrangement which is conveniently disposable after usage.

The waffle design in the tray surface enhances the rigidity of the final structure, in addition to minimizing heat transfer by conduction to the comestibles. The particular waffle design illustrated herein is selected to provide support for comestible products 28 arranged to be supported across the ridge crests with the number of ridges being selected to provide support for the particular product pieces without regard for the orientation of a particular product piece, which is often a concern with a packaging tray which is ridged in a single direction. As illustrated in FIG. 2 herein, it is desirable to arrange the comestibles in a single or monolayer on the ridge crests to provide for the maximum convective flow of hot air around each product piece. The size of the ridge squares formed by the first and second sets of perpendicularly oriented ridges is not particularly critical, except that the spacing between the ridges must be sufficiently small so as not to present orientation problems with regard to the particular type of comestible product being supported thereon. In general, a smaller ridge square will result in a more rigid tray. With the tray being formed from relatively low cost, low gauge sheet aluminum, the resultant product is sufficiently low in cost to be conveniently disposable after usage.

In one particular design for an embodiment of the present invention, the height of each ridge crest from trough to crest was selected to be 0.050 inches, the height of each aperture fin above a trough was selected to be 0.030 inches, the distance between adjacent ridge crests was 0.5 inches, the diameter of each convective aperture was chosen to be 0.234 inches, the sides of the tray arrangement were bent to form an angle of approximately 80 degrees with the tray surface, and the overall size of the tray was 6 inches by 9 inches. The percentage of the horizontal area of the tray surface occupied by the total area of all of the apertures was selected to be approximately twenty percent to provide a substantial convective flow of hot air around the comestible products.

The particular waffle design illustrated in the embodiments of FIGS. 1-5 has a square shape for each four adjoining ridges. In alternative embodiments, the shapes formed by adjoining ridges may form triangles or other polygonal figures, or alternatively may be circular in shape. Likewise the apertures provided for convective flow may be round, square, oval etc., with the size of each aperture in general being selected in accordance with the size of the waffle pattern or distance between single row ridges. Moreover, the apertures have open spaces greater than 10% of the tray arrangement surface area and preferably greater than 20% and even more preferably greater than 50%.

The height of each fin surrounding a convective aperture is desirably chosen to be as high as possible to encourage and enhance the convective flow of hot air through the aperture. However, it is desirable that the fins do not extend to the full height of the ridge crests to avoid conductively transferring heat to the comestible products supported thereon. It has been estimated that a flat tray with holes provided therein would provide a convective air flow therethrough of approximately 6 to 10 feet per minute in an electric oven, whereas the provision of fins around the convective apertures would increase the velocity of the convective air flow to the range of from 11 to 14 feet per minute. A similar increased convective air flow would be expected in a gas oven.

Extrapolating from theoretical design calculations confirms these estimates. When a proposed tray design has circular openings tapering from 0.306 inches to 0.250 inches in diameter, theoretical calculations predict an increase in air velocity of 59% over a straight orifice type opening of 0.306 inches in diameter. Thus under identical oven conditions, if the velocity through a 0.306 inches diameter orifice is 10 cm/sec, then the velocity through the tapered openings would be 15.9 cm/sec. These calculations are predicated upon the angle between the fin and orifice being 45° and a low coefficient of discharge because of the low ratio of nozzle length to diameter of the orifice. Therefore, one skilled in the art will appreciate that theoretically the air velocity decreases towards the edges of the tray because the rising hot air divides, some following a path of least resistance around the tray so that the holes along each of the four edges have negligible flow. Moreover, they will further appreciate that the height of the fins as well as the diameter of the apertures may be manipulated to obtain a desired air velocity.

The fins also provide for the collection of oil released by the comestible products during heating, with the oil dripping thereon following the contour of the ridged surface. In this manner a continuous film of oil will fill each collection cavity during usage of the tray with comestibles subject to the release of oil during heating thereof. Therefore despite apertures being present, little or no oil will drip from the commestible through the tray arrangement.

FIG. 6 illustrates another embodiment of the present invention, similar in overall structure to that illustrated in FIGS. 1 through 5, but wherein the corners of the convective heating tray are rounded. This tray is also formed from a substantially rectangular sheet of thin gauge aluminum foil, but the excess metal at each corner is simply pressed together to form irregular creases 30 at each rounded corner.

Although the present invention has been described in the context of a disposable aluminum tray for the packaging of comestible products, it is apparent that the teachings herein are also applicable to permanent types of cooking pans and vessels, suitable to having unpackaged frozen foods from the freezer placed thereon. Also, the tray may be constructed from other suitable materials, such as alternative metals, paper board, natural fibers, or synthetic materials, in either disposable or permanent type structures according to the teachings herein. Moreover, the tray may be darkly colored, which would have the effect to increase the radiant heating. This would allow one skilled in the art to manipulate time and temperature requirements for various comestibles. Although not necessary for the operation of this invention, it has been found that when colored surfaces are to be employed that the bottom surface layer should be darker than the top layer to better absorb the heat.

While several embodiments of the present invention have been described in detail, it will be apparent to one of ordinary skill in the art that the teachings of the present invention extend to many other variations and embodiments as will be apparent to one of ordinary skill in the art.

We claim:

1. A method of heating, in an oven, frozen French fried potatoes which are subject to the release of oil during heating thereof, which method significantly improves the deep-fried appearance, texture and taste of the heated potato, said method comprising:
   (a) placing the frozen potatoes on a disposable tray having a plurality of raised ridges on its upper surface, said ridges comprising a first plurality of parallel, regularly-spaced ridges extending in a first direction and a second plurality of parallel, regularly-spaced ridges extending in a second direction and intersecting said first plurality of ridges thereby enhancing the rigidity of the tray structure, and said tray also having a plurality of apertures between the ridges, such that each aperture is surrounded by four end passing ridges, and said ridges being arranged and spaced to support the potatoes across the ridge crests irrespective of the orientation of the potatoes on the tray thereby minimizing conductive heat transfer from the tray to the potatoes;
   (b) placing the tray in the oven;
   (c) heating the oven, whereby heated air convectively heats the potatoes by passing through the plurality of apertures and around said potatoes, said apertures containing greater than 10% open area based on the horizontal area of the tray surface area;
   (d) increasing the convective flow of heated air around the potatoes by providing inwardly-tapered raised fins around the apertures each fin rising to a fraction of the height of the raised ridges, so as to not contact the potatoes;
   (e) heating the potatoes in the oven to give an appetizing product having deep-fried appearance and texture with proper moisture content; and
   (f) collecting oil during said heating step in troughs formed between said raised fins, and said raised ridges such that little or no oil will drip from the potatoes through apertures in the tray.

2. The method of claim 1 wherein each aperture has a substantially circular shape and each raised fin is substantially frustoconical in shape.

3. The method of claim 1 or 2 wherein the first plurality of regularly-spaced ridges are perpendicular to the second plurality of regularly-spaced ridges and wherein the spacing between the first and second pluralities of ridges is substantially equal.

4. The method of claim 1 or 2 wherein the tray is placed in a gas or electric oven.

5. The method of claim 1 or 2 wherein the tray is packaged with the frozen potatoes.

6. The method of claim 1 or 2 wherein the tray has four sidewalls.

* * * * *